United States Patent
Girlando et al.

(10) Patent No.: US 10,984,926 B2
(45) Date of Patent: Apr. 20, 2021

(54) SUPPORT STRUCTURE AND LAYOUT FOR A HVDC DISCONNECTOR

(71) Applicant: GENERAL ELECTRIC TECHNOLOGY GMBH, Baden (CH)

(72) Inventors: Vincenzo Girlando, Padua (IT); Marco Nosilati, Vigonza (IT)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 197 days.

(21) Appl. No.: 16/340,584

(22) PCT Filed: Dec. 24, 2015

(86) PCT No.: PCT/EP2015/081239
§ 371 (c)(1),
(2) Date: Apr. 9, 2019

(87) PCT Pub. No.: WO2017/108141
PCT Pub. Date: Jun. 29, 2017

(65) Prior Publication Data
US 2019/0237222 A1   Aug. 1, 2019

(51) Int. Cl.
*H01B 17/14* (2006.01)
*H01B 17/36* (2006.01)
*H01H 31/02* (2006.01)
*H01B 17/42* (2006.01)
*H01H 31/28* (2006.01)
*H02J 3/36* (2006.01)

(52) U.S. Cl.
CPC ............ *H01B 17/14* (2013.01); *H01B 17/36* (2013.01); *H01B 17/42* (2013.01); *H01H 31/023* (2013.01); *H01H 31/28* (2013.01); *H02J 3/36* (2013.01)

(58) Field of Classification Search
CPC ................................ H01B 1/00; H01B 17/17
USPC .......................................................... 174/178
See application file for complete search history.

(56) References Cited

U.S. PATENT DOCUMENTS

| 6,166,323 | A | * | 12/2000 | Kelch | ............ | H02B 13/035 |
| | | | | | | 174/21 JS |
| 2012/0168224 | A1 | * | 7/2012 | Seifert | ............ | H01B 9/065 |
| | | | | | | 174/700 |
| 2013/0025912 | A1 | * | 1/2013 | Hoefner | ............ | H01B 17/36 |
| | | | | | | 174/156 |

FOREIGN PATENT DOCUMENTS

GB       316588 A    4/1930
WO    2012168142 A1  12/2012

OTHER PUBLICATIONS

International Search Report and Written Opinion dated Jun. 17, 2016 which was filed in connection with PCT/EP2015/081239 which was filed on Dec. 24, 2015.

* cited by examiner

*Primary Examiner* — William H. Mayo, III
*Assistant Examiner* — Krystal Robinson
(74) *Attorney, Agent, or Firm* — Eversheds Sutherland (US) LLP

(57) ABSTRACT

A support structure for a HVDC disconnector is disclosed. The support structure comprises a support insulator having a body enclosing a chamber; an insulating gas provided in the chamber; and a first flange and a second flange positioned at opposite ends of the support insulator. A rotating insulator may be positioned in the chamber.

11 Claims, 3 Drawing Sheets

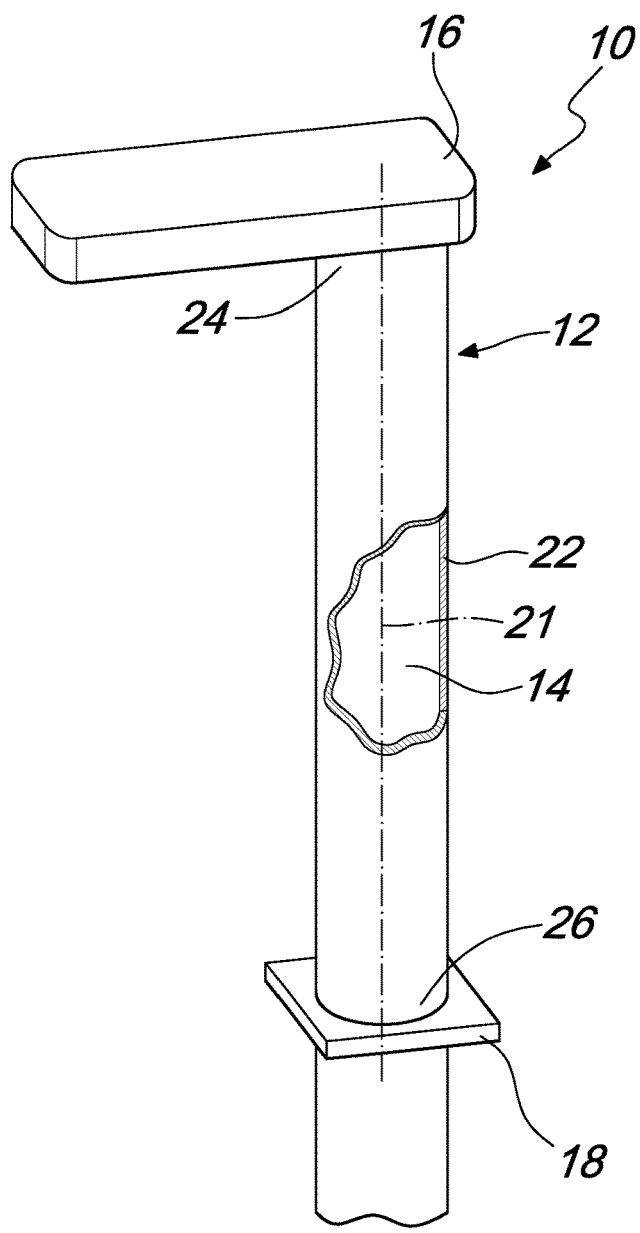
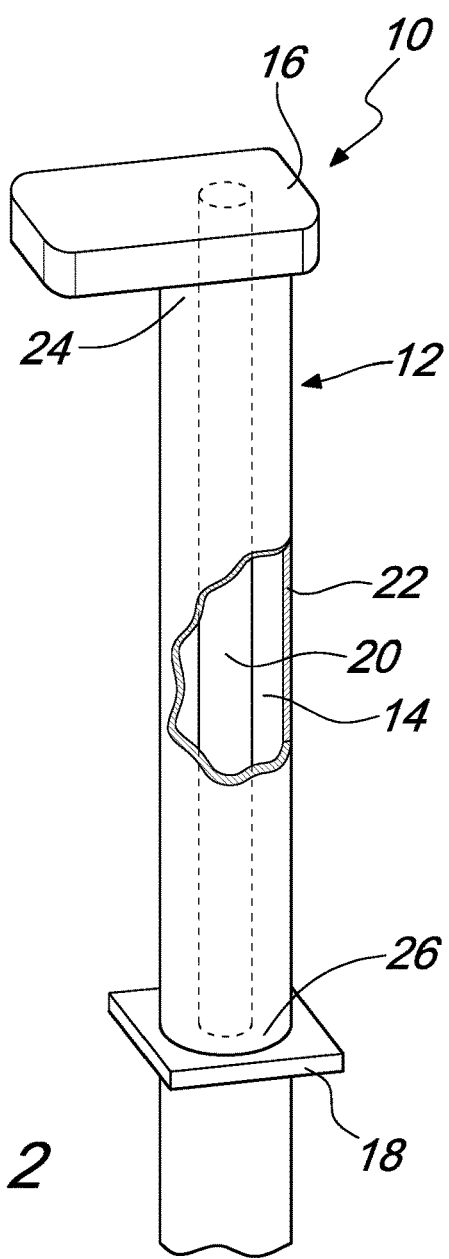

SUPPORT STRUCTURE AND LAYOUT FOR A HVDC DISCONNECTOR

TECHNICAL FIELD

This disclosure relates to the field of High Voltage Direct Current (HVDC) transmission systems, more particularly, to support structures for overhead or cable transmission lines and/or for switching systems, but not limited to HVDC only: could be for HVAC system as well.

BACKGROUND

A HVDC electric power distribution system uses direct current for the transmission of electrical power. HVDC transmission systems may be less expensive and may suffer lower electrical power losses over long-distance transmission. Generally, a HVDC transmission system comprises an overhead or cable transmission line and a terminal station. HVDC disconnectors may be used to connect and disconnect a transmission line from a terminal station.

In general, HVDC disconnectors have an insulating support structure. The support insulators generally have a circular cross-section, however, other cross-sections may be used. The support insulators may have a uniform cross-section or may also have a varying cross-section.

The support structure may comprise two or more support insulators, in series and in parallel. The support insulators may be porcelain insulators. Other support insulators may generally comprise a tube of insulating stiff material such as a polymeric material, which is filled by a core of insulating material, such as polyurethane. These support structures generally have a large number of components that affect the amount of time required for assembly.

The present disclosure is directed, at least in part, to improving or overcoming one or more aspects of the prior art system.

BRIEF SUMMARY OF THE INVENTION

In a first aspect, the present disclosure describes a support structure for a HVDC disconnector. The support structure comprises a support insulator having a body enclosing a chamber; an insulating gas provided in the chamber; and a first flange and a second flange positioned at opposite ends of the support insulator.

In a second aspect, the present disclosure describes a HVDC disconnector comprising a first support structure and a second support structure. The first and second support structures each comprising a support insulator having a body enclosing a chamber; an insulating gas provided in the chamber; a first flange and a second flange positioned at opposite ends of the support insulator.

The first support structure further comprises a first contact supported on the first flange. The second support structure further comprises a second contact supported on the first flange. The first and second contacts are configured to be mutually connectable.

BRIEF DESCRIPTION OF THE DRAWINGS

The foregoing and other features and advantages of the present disclosure will be more fully understood from the following description of various embodiments, when read together with the accompanying drawings, in which:

FIG. 1 is an isometric view of a first embodiment of structural insulator for a HVDC disconnector according to the present invention;

FIG. 2 is an isometric view of a second embodiment of structural insulator for a HVDC disconnector according to the present invention;

DETAILED DESCRIPTION

Figure 3:
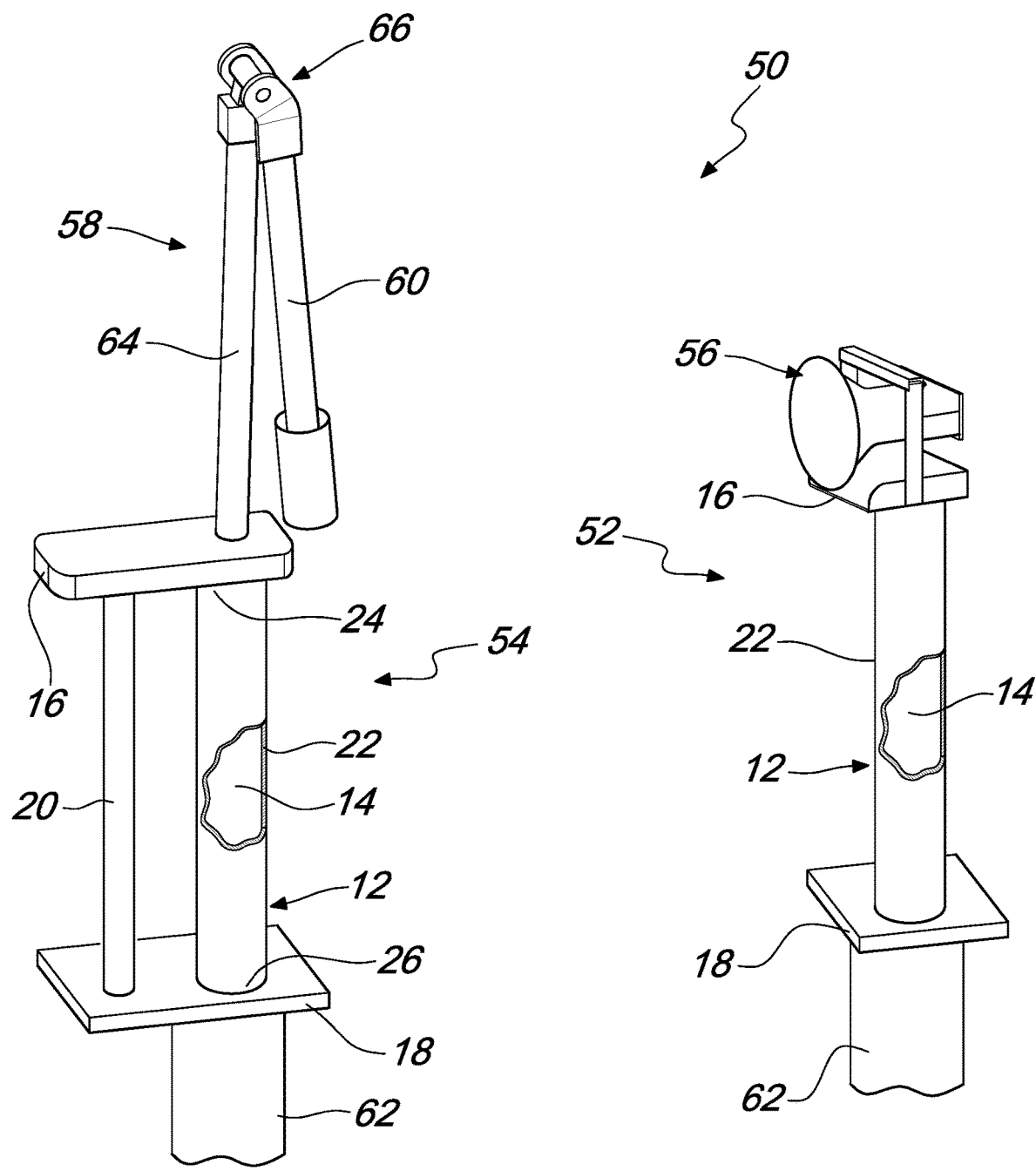
FIG. 3 is an isometric view of a first embodiment of a HVDC disconnector according to the present invention.

This disclosure generally relates to a support structure for a HVDC disconnector. FIG. 1 schematically illustrates a support structure 10, in a first embodiment. The support structure 10 comprises a support insulator 12, a first flange 16 and a second flange 18 positioned at opposite ends of the support insulator 12.

The support insulator 12 has body 22 that is hollow. The body 22 encompasses a chamber 14. Body 22 is composed of a wall that surrounds the chamber 14. Body 22 may have a first end 24 and a second end 26. The first end 24 and the second end 26 are sealed.

Body 22 has an elongated structure. In an embodiment, Body 22 has a circular cross section. The body 22 is tubular in structure. Body 22 encircles the chamber 14. Chamber 14 extends longitudinally between the first end 24 and the second end 26. Chamber 14 encompasses a substantial portion of the overall volume of the body 22. The volume of the chamber 14 is determined by the inner diameter and the length of the body 22.

Body 22 may have a longitudinal axis 21 and a diameter that is generally uniform along the longitudinal axis. In a further embodiment, the diameter of the body 22 varies along the longitudinal axis so as to have a varying cross section.

The body 22 is formed of a composite material. The composite material has electrical insulating properties and is capable of providing mechanical support. The composite material may be a material selected from a groups comprising plastic composites, fiberglass composites and epoxy composites. The composite material may be a material comprising a mixture of plastic composites, fiberglass composites and/or epoxy composites.

The composite material of the sheds in an embodiment is High temperature vulcanized (HTV) silicone rubber, Low temperature vulcanized (LTV) silicon rubber and/or liquid silicone rubber (LSR). In an embodiment, body 22 can be composed by a single part or two or more parts, in series or in parallel. The parts may be composed of the same composite material or may be composed of different combinations of composite materials.

The support structure 10 comprises an insulating gas. The insulating gas is provided in the chamber 14. The insulating gas is in an embodiment an ecological type gas. In an embodiment, the insulating gas is nitrogen. In an embodiment, alternative insulating gases may be used. A gas mixture comprising nitrogen $SF_6$ (sulphur hexafluoride), $CF_4$ (tetrafluoromethane) and $SF_6$. The foregoing mixture may further include other gases. In a further embodiment, a gas mixture of $CO_2$ (carbon dioxide) and heptafluoroisobutyronitrile may be used.

The insulating gas is contained in the body 22. The insulating gas is sealed in the body 22. Body 22 is configured to prevent leakage of the insulating gas. In an embodiment, body 22 is sealed at first end 24 and second end 26 so that the insulating gas is contained within the chamber 14. In an embodiment, first end 24 and second end 26 are provided with metallic flanges with or without use of gaskets that ensure air tightness over a wide temperature range.

In an embodiment, the body 22 is provided with a sealing mechanism for passage of insulating gas. The sealing mechanism enables insulating gas to be introduced into the chamber 14. The sealing mechanism enables the insulating gas to be evacuated from the chamber 14. In a further embodiment, the sealing mechanism is provided at the first end 24 or second end 26.

The insulating gas may be contained under pressure within the body 22. The insulating gas may be contained under low pressure. In an embodiment, the insulating gas may be contained in a range of 0.05-0.5 MPa. In a further embodiment, the insulating gas may be contained in a range of 0.1-0.2 MPa.

The first flange 16 and the second flange 18 are positioned at opposite ends of the support insulator 12. Support insulator 12 insulates first flange 16 from the second flange 18. First flange 16 and second flange 18 are positioned so as to flank the body 22. First flange 16 is positioned at the first end 24 of the body 22. Second flange 18 is positioned at the second end 26 of the body 22. The first and second flanges 16, 18 have a corresponding size and form. In an embodiment, first and second flanges 16, 18 have non-corresponding sizes and forms.

First flange 16 and second flange 18 are fixedly joined to the body 22 by mechanical or chemical methods. In an embodiment, the first and second flanges 16, 18 are bolted to the body 22. In a further embodiment, the first and second flanges 16, 18 are glued to the body 22.

First flange 16 and second flange 18 are connected to the body 22 in a manner to be mutually parallel. Body 22 is substantially perpendicular to the first and second flanges 16, 18. The body 22 is positioned adjacent to the edges of the first and second flanges 16, 18. In an embodiment, body 22 is positioned centrally on the first and second flanges 16, 18.

In an embodiment, the sealing mechanism for passage of the insulating gas is provided on the first flange 16 or the second flange 18. In a further embodiment, the first flange 16 and second flange 18 are joined to the body 22 in a manner to provide an airtight seal so as to close the chamber 14 for containment of the insulating gas. Gaskets are provided between first and second flanges 16, 18 and the respective ends of the body 22.

In an embodiment, first flange 16 and second flange 18 have plate-like structures. The first flange 16 and second flange 18 are formed as panels having planar surfaces. The planar surfaces of the first flange 16 are parallel to the planar surfaces of the second flange 18. The longitudinal axis of the body 22 intersects the planar surfaces of the first and second flanges 16, 18.

First flange 16 and second flange 18 are metallic. First flange 16 is formed of aluminium or an aluminium alloy. Second flange 18 is formed of aluminium or an aluminium alloy.

First flange 16 and second flange 18 are configured to serve as support structures. The first flange 16 is a metallic base frame for supporting the contacts of the HVDC disconnectors. First flange 16 is provided with a terminal for voltage transmission. The second flange 18 serves as a metallic base frame for supporting the support insulator 12.

The first flange 16 is configured to shield from corona discharge. The first flange 16 may have a rounded shape with radius of curvature that is suitable for the prevention of corona inception so as to shield the contact of the HVDC disconnector mounted thereon.

With reference to FIG. 2, in a second embodiment, the support structure 10 further comprises a rotatable insulator 20 for actuation of the mobile contact of the HVDC disconnector. The rotatable insulator 20 is positioned in the chamber 14. Rotatable insulator 20 is centrally positioned in the chamber 14 of the support insulator 12. The rotatable insulator 20 is positioned in alignment with the longitudinal axis 21 of the support insulator 12. The central axis of the rotatable insulator 20 is aligned with the longitudinal axis 21 of the support insulator 12. In an embodiment, the central axis of the rotatable insulator 20 is parallel with the longitudinal axis 21 of the support insulator 12. In an embodiment, rotatable insulator 20 has a rod-like shape. In an alternative embodiment, the rotatable insulator 20 is not centrally positioned in the chamber 14.

The rotatable insulator 20 is positioned between the first and second flanges 16, 18. The first flange 16 and the second flange 18 are positioned at opposite ends of the rotatable insulator 20. First flange 16 and second flange 18 are positioned so as to flank the rotatable insulator 20.

The rotatable insulator 20 is connected to the first and second flanges 16, 18. First and second flanges 16, 18 are configured to received opposite ends of the rotatable insulator 20. The rotatable insulator 20 is retained in position by connections at the first and second flanges 16, 18. The ends of the rotatable insulator 20 may extend into the first and second flanges 16, 18 at the respective connections.

In an embodiment, ends of the rotatable insulator 20 extend through the first and second flanges 16, 18. The connections between ends of the rotatable insulator 20 and the first and second flanges 16, 18 are airtight to prevent leakage of the insulating gas. At least one end of the rotatable insulator 20 extends through the first flange 16 to be available for connection to a contact of the HVDC disconnector.

Rotatable insulator 20 is rotatably supported by the first and the second flanges 16, 18. Rotatable insulator 20 is rotatable about the central axis thereof. In an embodiment, the rotatable insulator 20 is rotatable about the longitudinal axis 21 of the body 22. The rotatable connections between the rotatable insulator 20 and the first and second flanges 16, 18 are airtight to prevent leakage of the insulating gas.

In an alternative embodiment, the rotatable insulator 20 is positioned adjacent the support insulator 12. Rotatable insulator 20 is spaced from the support insulator 12. With the rotatable insulator 20 being externally positioned relative to the support insulator 12, the connections between the rotatable insulator 20 and the first and second flanges 16, 18 are not airtight.

With reference to FIG. 3, a HVDC disconnector 50 in the first embodiment is illustrated. The HVDC disconnector 50 comprises a first support structure 52 and a second support structure 54. The first support structure 52 and the second support structure 54 comprise the features of the support structure 10 as described hereinafter.

The first support structure 52 comprises a support insulator 12 having a body 22 enclosing a chamber 14. An insulating gas is provided in the chamber 14. A first flange 16 and a second flange 18 are positioned at opposite ends of the support insulator 12.

The first flange 16, of the first support structure 52, supports a first contact 56. The first contact 56 may be any known contact for HVDC disconnectors. Support insulator 12 maintains the first contact 56, positioned on first flange 16, at a required position. First contact 56 is positioned on a planar surface of the first flange 16. First contact 56 may extend in a direction substantially perpendicular to the planar first flange 16. First contact 56 is positioned on the first flange 16 at a side opposite to the support insulator 12. In an embodiment, the first contact 56 is a fixed contact.

The support insulator 12, of the first support structure 52, is positioned on the second flange 18. The second flange 18 is connected to a stand 62. The stand 62 holds the second flange 18 from the ground at a required height. Stand 62 is positioned on a planar surface of the second flange 18. Stand 62 extends in a direction substantially perpendicular to the planar surface of the second flange 18. Stand 62 is positioned on the second flange 18 at a side opposite to the support insulator 12.

The second support structure 54 comprises a support insulator 12 having a body 22 enclosing a chamber 14. An insulating gas is provided in the chamber 14. A first flange 16 and a second flange 18 are positioned at opposite ends of the support insulator 12.

The first flange 16, of the second support structure 54, supports a second contact 58. The second contact 58 may be a known contact for HVDC disconnectors. Support insulator 12 maintains the second contact 58, positioned on first flange 16, at a required position. Second contact 58 is positioned on a planar surface of the first flange 16. Second contact 58 extends in a direction substantially perpendicular to the planar surface of the first flange 16. Second contact 58 is positioned on the first flange 16 at a side opposite to the stand 62. The first and second contacts 56, 58 are configured to be mutually connectable.

In an embodiment, the second contact 58 is a mobile contact. The mobile contact 58 has a movable arm 60 for connection to the fixed contact 56. The movable arm 60 may be connected to the first flange 16 by a fixed arm 64.

Fixed arm 64 extends in a direction substantially perpendicular to the planar surface of the first flange 16. Fixed arm 64 is positioned in alignment with the support insulator 12. Fixed arm 64 is positioned in alignment with the longitudinal axis of body 22 of the support insulator 12. Mobile contact 58 is positioned on the first flange 16 at a side opposite to the support insulator 12.

The support insulator 12, of the second support structure 54, is positioned on the second flange 18. The second flange 18 is connected to a stand 62. The stand 62 holds the second flange 18 from the ground at a required height. Stand 62 is positioned on a planar surface of the second flange 18. Stand 62 extends in a direction substantially perpendicular to the planar second flange 18. Stand 62 is positioned on the second flange 18 at a side opposite to the support insulator 12.

The first support structure 52 is spaced apart from the second support structure 54. The spatial positions of first and second support structures 52, 54 are determined by the respective positions of the stands 62. The longitudinal axes 21 of the respective bodies 22 of the first and second support structures 52, 54 are parallel. The planar surfaces of the first and second flanges 16, 18 of the first support structure 52 are parallel to the respective planar surfaces of the first and second flanges 16, 18 of the second support structure 54. The respective first flanges 16 are configured to shield from corona discharge.

The second support structure 54 further comprises a rotatable insulator 20 for actuating the movable arm 60. The rotatable insulator 20 is positioned adjacent the support insulator 12. Rotatable insulator 20 is spaced from the support insulator 12.

In further embodiment, both the first and second contacts 56, 58 may be movable contacts. In yet a further embodiment, two or more support structures 52, 54 may be provided with combinations of mobile contact and/or fixed contact.

Figure 4:
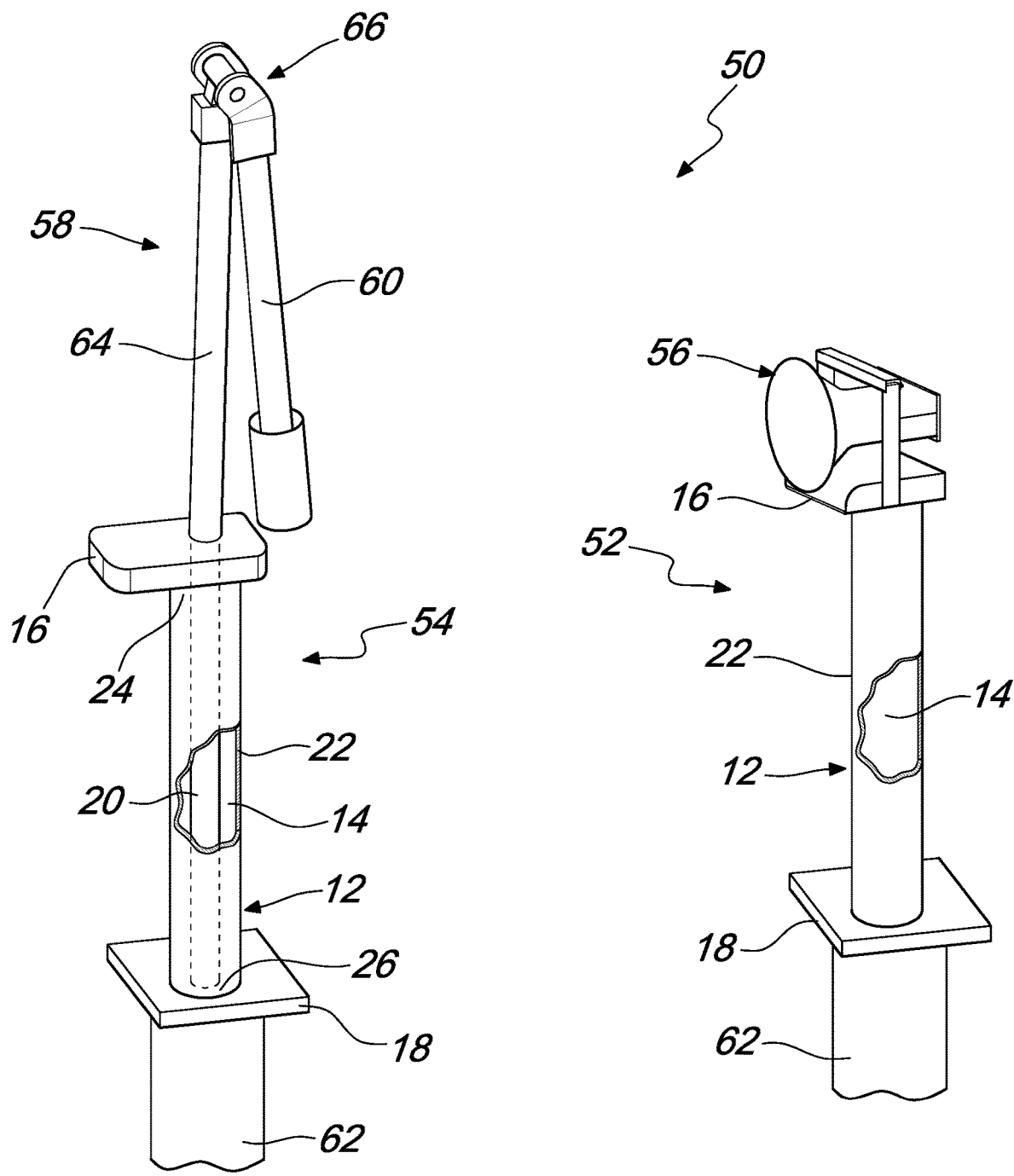
FIG. 4 is an isometric view of a second embodiment of a HVDC disconnector according to the present invention.

With reference to FIG. 4, a HVDC disconnector 50 in the second embodiment is illustrated. In the second embodiment, the second support structure 54 further comprises a rotatable insulator 20 positioned in the chamber 14. The rotatable insulator 20 is aligned to the fixed arm 64 of the mobile contact 58. The central axis of the rotatable insulator 20 is aligned to the central axis of the fixed arm 64.

The rotatable insulator 20 is coupled to the movable arm 60 through the first flange 16. The rotatable insulator 20 is coupled to the fixed arm 64 through the first flange 16. Rotatable insulator 20 is coupled to the movable arm 60 through the fixed arm 64

The HVDC disconnector 50 may be a knee-type disconnector. In an embodiment, the rotatable insulator 20 rotates, to transmit the movement to the fixed arm 64 through a bevel gear and a crank-rod system. The movement of the movable arm 60 may be controlled by a rack-pinion system housed inside the knee 66. In a further embodiment, the HVDC disconnector 50 may be a double knee type or double and break or other common disconnector types.

The skilled person would appreciate that foregoing embodiments may be modified or combined to obtain the support structure 10 and the HVDC disconnector 50 of the present disclosure.

INDUSTRIAL APPLICABILITY

This disclosure describes a support structure 10 for a HVDC disconnector 50, in particular for a HVDC disconnector 50 rated 800 kV and greater. More in particular for a knee-type HVDC disconnector 50. The support structure 10 may enable a support structure 10 for the HVDC disconnector 50 to be limited to a single structural element. In an embodiment, the support structure 10 may be used for a HVAC system.

Support structure 10 comprises a support insulator 12 having a hollow chamber 14 and formed of a composite material. The support insulator 12 enables the structural support to have a relatively higher diameter with respect to solid core structural insulators in HVDC disconnectors 50.

Support insulator 12 reduces the possibility of deformations occurring for a given load for the HVDC disconnector 50. Accordingly, the support insulator 12 is sufficient to provide equivalent or better mechanical performance thereby permitting a reduction in overall weight, number of components and size of the support structure 10. A support insulator 12 is sufficient to provide equivalent or better electrical performance With the support structure a single pole instead of three post insulators (used in actual tripode structure) reduces the probability of discharge to earth along with a reduction in the overall footprint and assembly time of the HVDC disconnector 50. In an embodiment, the support structure 10 is sufficient to provide the required mechanical and electrical performance for the HVDC disconnector 50.

Support structure 10 has a reduced number of components thereby decreasing the amount of time required for assembling and disassembling the HVDC disconnector 50. With the reduced number of components, the HVDC disconnector 50 has a reduced footprint. The reduced encumbrance of the HVDC disconnector 50 allows for a greater number of disconnectors to be located in a given area.

Support insulator 12 provides an option to position a rotatable insulator 20 within the hollow chamber 14 thereby further reducing the overall footprint of the HVDC disconnector 50. The first flange 16 of the support structure 10 may be configured to enable corona shielding capability. In this case the support structure 10 can be supplied without anti-corona rings thereby decreasing fabrication material, components and assembling time.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

What we claim is:

1. A support structure for a High Voltage Direct Current disconnector, the support structure comprising:
   a support insulator having a body enclosing a chamber;
   an insulating gas provided in the chamber; and
   a first flange and a second flange positioned at opposite ends of the support insulator,
   wherein the support structure further comprises a rotatable insulator which is positioned between the first and second flanges of the support structure and which is positioned in the chamber or externally from and adjacent the support insulator, the rotatable insulator being available for a connection through the first flange, and
   wherein the support structure further comprises a mobile contact which is supported by the first flange, the mobile contact being of a knee type configuration and having a movable arm configured to be actuated by the rotatable insulator.

2. The support structure of claim 1 wherein the body is formed of a composite material.

3. The support structure of claim 2 wherein the composite material is selected from a group consisting of high temperature vulcanized silicone rubber, low temperature vulcanized silicon rubber and liquid silicone rubber.

4. The support structure of claim 1 wherein the insulating gas is selected from a group consisting of nitrogen, a gas mixture comprising nitrogen $SF_6$, $CF_4$, and $SF_6$, and a gas mixture consisting of $CO_2$ and heptafluoroisobutyronitrile.

5. The support structure of claim 4 wherein the insulating gas is nitrogen.

6. The support structure of claim 1 wherein the first flange is configured to shield from corona discharge.

7. The support structure of claim 1 wherein the second flange is a metallic base frame for supporting the support insulator.

8. The support structure of claim 1 wherein the body has a tube-like structure.

9. A high voltage direct current (HVDC) disconnector comprising:
   a first support structure comprising:
      a support insulator having a body enclosing a chamber;
      an insulating gas provided in the chamber; and
      a first flange and a second flange positioned at opposite ends of the support insulator, the first flange supporting a first contact; and
   a second support structure spaced apart from the first support structure, the second support structure comprising:
      a support insulator having a body enclosing a chamber;
      an insulating gas provided in the chamber; and
      a first flange and a second flange positioned at opposite ends of the support insulator, the first flange supporting a second contact wherein the first and second contacts are configured to be mutually connectable,
   wherein the first contact is a fixed contact and the second contact is a mobile contact of a knee type configuration, the mobile contact having a movable arm for connection to the fixed contact wherein the second support structure further comprises a rotatable insulator for actuating the movable arm, the rotatable insulator being positioned between the first and second flanges of the second support structure.

10. The HVDC disconnector of claim 9 wherein the rotatable insulator is positioned in the chamber and is connected to the movable arm through the first flange.

11. The HVDC disconnector of claim 9 wherein the respective first flanges of the first support structure and the second support structure are configured to shield from corona discharge.

* * * * *